United States Patent [19]

Poeta

[11] 4,037,983
[45] July 26, 1977

[54] WIND MOTOR

[76] Inventor: Rolando Poeta, Viale Certosa, 45, Milan, Italy

[21] Appl. No.: 671,864

[22] Filed: Mar. 30, 1976

[30] Foreign Application Priority Data

Apr. 7, 1975 Italy .................................. 22027/75

[51] Int. Cl.² .......................... F03D 3/04; F03D 7/06
[52] U.S. Cl. ......................................... 415/2; 415/66;
416/111; 416/119
[58] Field of Search ...................... 415/2, 3, 4, 8, 66;
416/8, 9, 10, 11, 12, 120, 121, 122, 111, 119;
417/398

[56] References Cited

U.S. PATENT DOCUMENTS

| 447,915 | 3/1891 | Stephens | 416/120 |
|---|---|---|---|
| 516,164 | 3/1894 | Nichols | 416/120 |
| 796,820 | 8/1905 | Cummings | 415/66 |
| 1,568,718 | 1/1926 | Brattland | 415/4 |

FOREIGN PATENT DOCUMENTS

| 893,164 | 6/1944 | France | 415/2 |

Primary Examiner—Carlton R. Croyle
Assistant Examiner—L. J. Casaregola
Attorney, Agent, or Firm—Guido Modiano; Albert Josif

[57] ABSTRACT

Wind motor comprising one or more sets of rotors, arranged each to project outwardly with respect to the adjacent one in the direction of the wind, such that only the useful part of the subsequent rotor is exposed to the wind flow. The vertical axis rotors are, in aligned arrangement on oblique V-like extending radial arms, pivotally mounted to a common and fixed vertical shaft for self-orientation in the direction of the wind and for angular self-adjustment by bringing the "V" arranged arms closer to each other.

1 Claim, 4 Drawing Figures

WIND MOTOR

BACKGROUND OF THE INVENTION

Various types of wind motors are known to have been developed. However, these only utilize parts of their areas exposed to the wind, forbid the presentation of large areas to the wind, whereby their top outputs are rather limited, and utilize only a small range of the wind velocity, in spite of some complex and costly self-adjustment mechanisms adopted.

SUMMARY OF THE INVENTION

The instant wind motor comprises a number of identical rotors (or rotors of different diameters), spaced cylindrically from one another and inclined with respect to the wind direction, such that each forward rotor covers or blankets the negative part (or negative half) of the rotor just behind it, the foremost rotor having its negative part blanketed by a deflector or baffle member.

Consequently, the inventive wind motor permits the use of practically the entire area of it which remains exposed to the wind; allows the achievement of practically unlimited output rates; and is highly efficient at any wind velocity, thanks to the provision of a self-adjustment system of extreme simplicity.

BRIEF DESCRIPTION OF THE DRAWINGS

In the accompanying drawing:

FIG. 4 shows a transmission system for the rotors.

DESCRIPTION OF PREFERRED EMBODIMENTS

Figure 1:
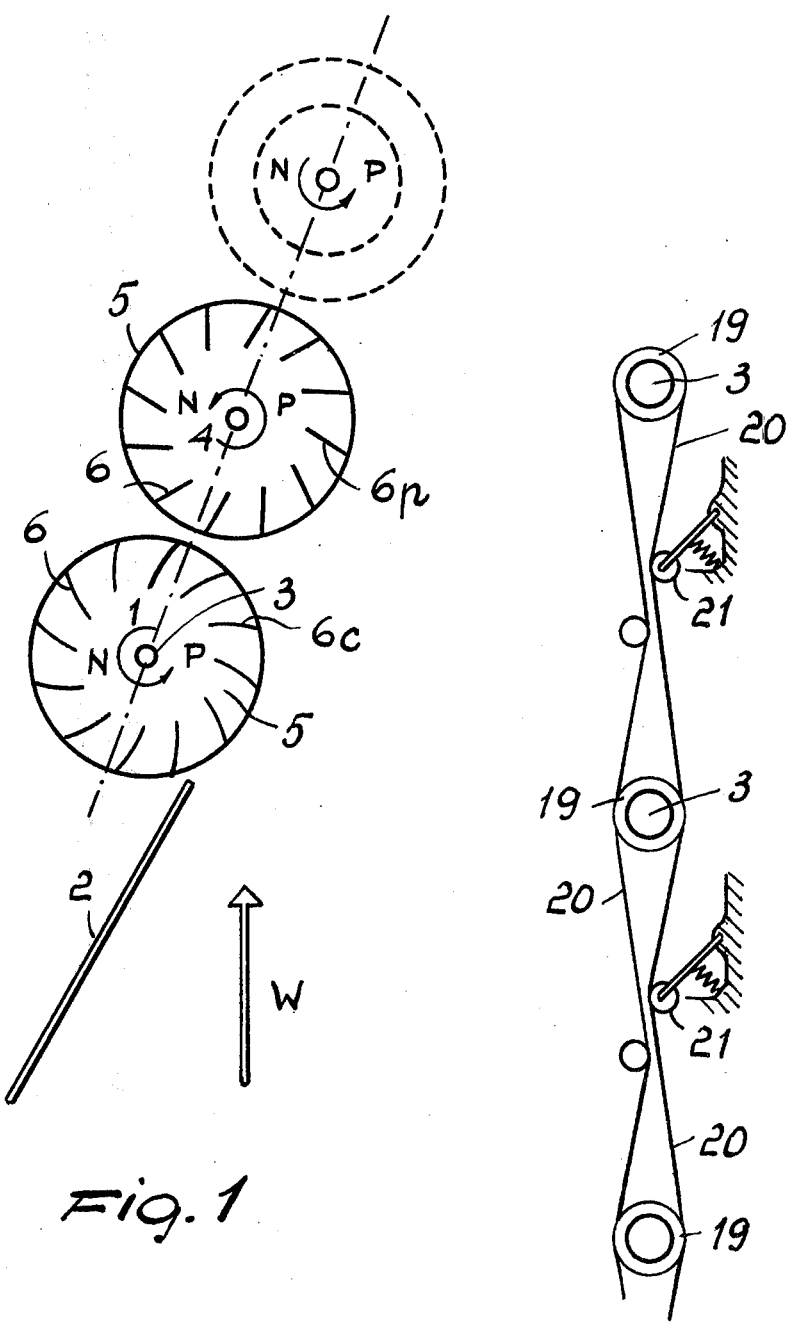
FIG. 1 illustrates diagrammatically the principle of this invention, the arrow W indicating the wind direction.

FIG. 1 shows schematically a set of three rotors (each set actually may comprise a plurality of rotors, amounting to several tenths in number). The wind impinges on the first rotor 1 of the set by means of a deflector 2 which blankets that part N of the rotor which is negative to the rotation thereof, and creates, about the rotor shaft 3 axis, a torque moment dependent on the resultant of the wind forces acting on the positive part P multiplied by the resultant force distance from the rotation center 3. The second rotor 4 has its negative part blanketed by the positive part of the first rotor, the third rotor has its negative part similarly blanketed by the second rotor positive part, and so forth. The capability by a preceding rotor of partially blanketing the subsequent rotor derives from the former ability to make full use of the wind velocity, the wind flow leaving the rear vanes with negligible velocity.

Each rotor is indeed comprised of a central shaft 3 carrying two parallel plates 5 at its ends, whereto arcuate rectangular panels are affixed perpendicularly (as shown in 6c), or alternatively, radially arranged plates 6p, their most convenient incline being determined with the well known method of the triangle of velocities (input and output, peripheral and relative), taking into consideration the data yielded by actual tests.

Those plates or vanes 6 have a width dimension such that, depending on the cited radial incline, even a low velocity wind is allowed to flow inwardly to the rotor, to act on the rear vanes as well of each rotor, for an optimal utilization of the latter.

The wind motor according to this invention, with a set of rotors inclined to the wind direction, may be implemented in several different ways: with horizontal axis rotors or vertical axis ones; with either a single, or dual, or multiple rotor set, or with a symmetrical or asymmetrical one, without departing from the invention scope.

Figure 2:
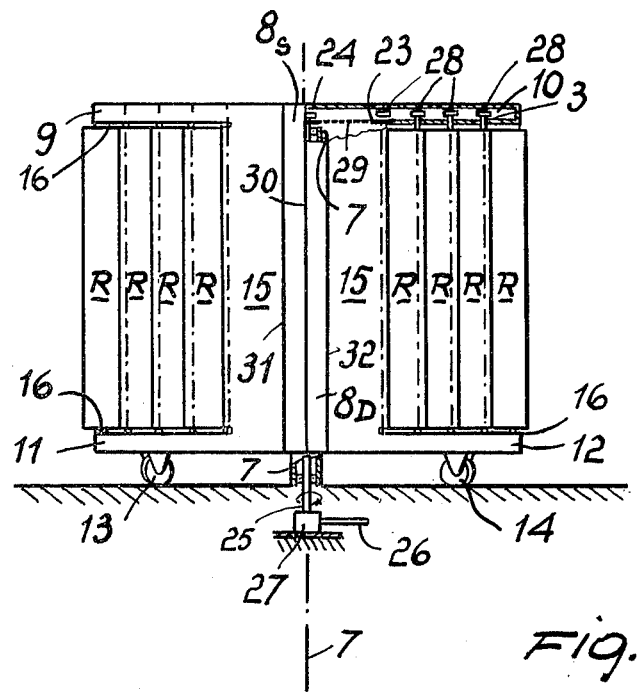
FIG. 2 shows an elevational view of one embodiment of the invention.
Figure 3:
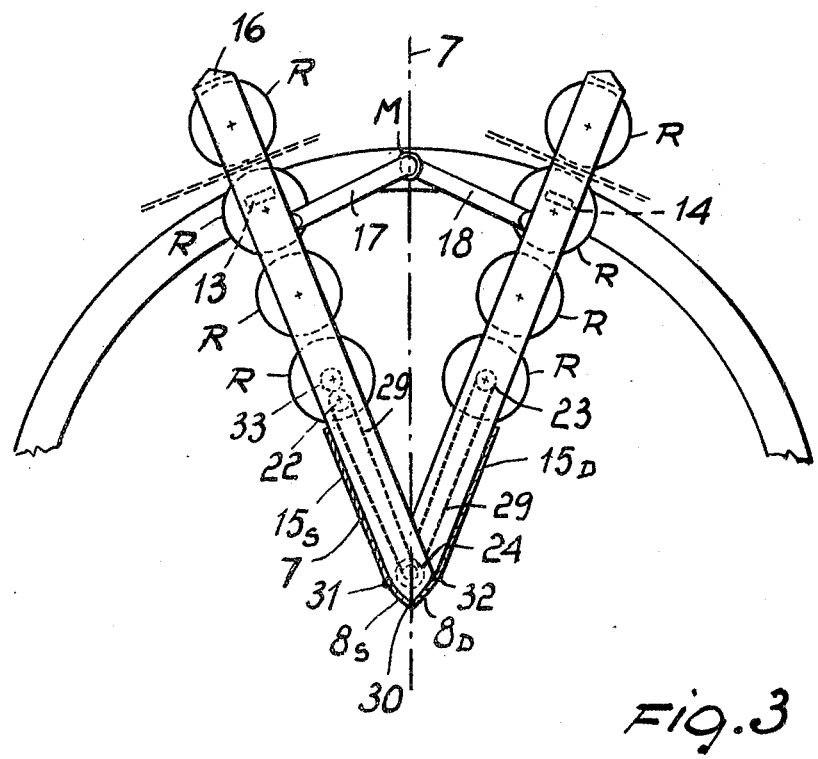
FIG. 3 is a view from above of FIG. 2.

In any case, each set of rotors is provided with variable angle orientation capabilities with respect to the wind direction, in that the higher the wind velocity, the more the rotors tend to arrange themselves parallel to the direction of the wind, thus reducing the exposed area. In this manner, self-adjusting capabilities are also achieved which, while eliminating all risks of structural failure in stormy conditions, permit an optimal utilization of the instant wind motor, since the wind action occurs more tangentially. By way of example, the following embodiment of the invention will be discussed which includes a dual symmetrical set or arrangement of vertical axis rotors with automatic orientation to the wind, and a self-adjustment system (FIGS. 2 and 3).

Onto an upright or pivot post 7, which is anchored to the floor or ground surface, the ends (deflector 8,15) are mounted of the two upper radial arms 9,10 and lower radial arms 11,12, carrying each their own bank of aligned rotors. The lower arms 11,12 are each provided with one or more wheels 13,14 having their axes convergent to the self-orientation post 7 axis of direction and approach. The upper arms 9,10 are joined to the lower ones by their own deflector surfaces 8,15, by a rear upright 16, and by the shafts 3 of the rotors themselves, thereby two vertical "V" shaped banks or "planes" are obtained in practice. Each bank (the left-hand one and the right-hand one) is formed by a number of vertical axis rotors R (FIGS. 2 and 3), such as to form inclined banks or "planes", arranged symmetrically to the wind direction. As viewed from the top, the wind motor takes the aspect of a "V", self-orientable about its apex, wherethrough the post 7 passes which hingedly carries the ends of the four arms 9,10,11, and 12 (two upper ones and two lower ones) comprised of demountable metal lattice structures. The angle included between the two "V" banks or "planes" is variable, and decreases from a maximum whereat each rotor is allowed to just blanket the negative part of the subsequent rotor, to a minimum value whereat the two banks are nearly parallel to each other and lie in the direction of the wind in order to present a minimal front area when the wind is very strong. That angle is adjusted by the very pressure of the wind: the stronger the wind, the lesser becomes the exposed front area. Thus, with a simple swinging movement of the two rotor banks (or rotor carriers) toward each other, the wind angle of incidence to the active vanes is also varied, with a view to improving the wind motor efficiency. This allows the use of simple, robust, lightweight and inexpensive rotors. The two "V" arranged planes or banks are united at the apex of the "V" through their common ends as well as by two pairs of levers: one pair, 17,18, is hinged to the upper arms, and the other pair is hinged to the lower arms. Such pairs have each of their levers united at the common free ends and cause the deformation of a coil spring M. Said coil spring may be torque loaded, if arranged with its axis vertical (FIG. 3), or compression or tension loaded, if arranged transversally with its horizontal axis. Its function is that of urging the two V-arranged banks toward their positions of maximum divergence (suitable for low wind velocities), and is deformed as the banks approach each other under the influence of the wind side pressure. Each rotor is connected to the remaining rotors by a chain type of drive connection (or alternatively, by a connecting rod drive, "V" belts, or bevel gear shafts) since, all the rotors being equal, their angular velocities are equal. The selection of the drive connection method will depend on several factors. By way of example, the following embodiment will be discussed.

The lower ends of the various shafts 3 of the rotors R are provided with sprocket wheels 19 engaging with a closed loop chain 20 interconnecting all the wheels in one rotor bank. The chain 20 is kept tensioned by tensioners 21, which are off set such as to use their full excursion and allow an increase of the number of teeth in mesh engagement with the wheels 19. The power thus collected at the bases of the several rotors in each bank (left and right-hand) is transferred, through the chain 29, from gear wheels 22,23, mounted to the other top ends of the shafts of each of the two nearest rotors, to the dual gear wheels 24 of the shaft 25 (internal and coaxial to the hollow fixed post 7) with an appropriate drive ratio. The gear 22 meshes with the gear 33 of the rotor, thereby producing that reversal of the direction of rotation which is required in order to drive the common shaft 25. From said shaft 25, the power flows to the final or utilizer shaft 26, arranged horizontally, through a pair of bevel gears 27 located at the base thereof, which achieve a further increase of rpm's. The chains 20, together with their sprockets 19 and the rotor supports 28 with their bearings, are all enclosed within their relative lower and upper arms, respectively, which are made tight and contain the lubricating oil for the various members. The latter are thus operated in an environment which is isolated from the wind and weather: thereby, maintenance requirements are reduced and durability improved.

The end edge of each deflector 15D-15S is united to the end edge of the other deflector, through surfaces 8d-8S commonly hinged at the apex 30 as well as to the deflectors at the areas 31-32. In this manner, the wind does not impinge on the post 7, but rather on more streamlined surfaces 8-15, and the two surfaces or planes retain in a most functional way their capabilities to move closer to each other and away from each other, thus producing an advantageous vacuum inside the "V" dihedral.

I claim:

1. A wind motor comprising a pair of horizontally disposed rotor support arms each having one end thereof pivotally mounted about a common vertical axis, two batteries of rotors each battery being respectively supported by one of said rotor support arms, each rotor battery including a plurality of rotors and each rotor comprising a series of elongated vertically extending blades arranged about a vertical rotor axis, the plurality of rotors in each battery being arranged in tandem fashion along their respective rotor support arm, and a pair of vertically extending deflector plates respectively mounted on said pair of rotor support arms and extending between said batteries of rotors and said common vertical axis, said rotor arms being positionable to arrange said batteries of rotors in a "V" formation which may be pointed into the wind to extract useful power therefrom.

* * * * *